(12) United States Patent
Oh

(10) Patent No.: US 8,977,264 B2
(45) Date of Patent: Mar. 10, 2015

(54) APPARATUS AND METHOD FOR PREVENTING PERFORMANCE DEGRADATION OF CALL SERVICE IN A PORTABLE TERMINAL

(75) Inventor: Se-Wan Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 13/456,496

(22) Filed: Apr. 26, 2012

(65) Prior Publication Data

US 2013/0017822 A1    Jan. 17, 2013

(30) Foreign Application Priority Data

Jul. 15, 2011   (KR) .......................... 10-2011-0070446

(51) Int. Cl.
*H04W 48/18*     (2009.01)
*H04W 8/18*      (2009.01)

(52) U.S. Cl.
CPC ............... *H04W 8/18* (2013.01); *H04W 48/18* (2013.01)
USPC .................. 455/435.3; 455/435.2; 455/435.1; 455/432.1; 455/525

(58) Field of Classification Search
CPC ..... H04W 24/00; H04W 24/02; H04W 48/18; H04W 48/00
USPC ............ 455/432.1, 435.1, 435.2, 435.3, 525, 455/574, 436–444
See application file for complete search history.

(56) References Cited

U.S. PATENT DOCUMENTS

| | | | |
|---|---|---|---|
| 8,073,441 B1 * | 12/2011 | Unger et al. ............... | 455/422.1 |
| 8,249,636 B2 * | 8/2012 | Tu et al. ........................ | 455/510 |
| 2007/0082688 A1 * | 4/2007 | Tu et al. ........................ | 455/515 |
| 2007/0191005 A1 * | 8/2007 | Cooper et al. ................ | 455/434 |
| 2009/0264126 A1 * | 10/2009 | Khetawat et al. .......... | 455/435.1 |

FOREIGN PATENT DOCUMENTS

KR    10-2003-0046658 A    6/2003

* cited by examiner

*Primary Examiner* — Kashif Siddiqui
*Assistant Examiner* — Farideh Madani
(74) *Attorney, Agent, or Firm* — Jefferson IP Law, LLP

(57) ABSTRACT

An apparatus and method for preventing performance degradation of a call service in a portable terminal are provided. In the apparatus, a memory stores a Preferred Roaming List (PRL) including information about a plurality of systems and an avoidance list including information about a system to which access has failed the predetermined number or more times, and when an access attempt to originate or terminate a call to or from a specific system acquired in a weak electrical field has failed a predetermined number or more times, a controller controls reacquisition of the specific system and attempting of call origination to or call termination from the reacquired specific system.

14 Claims, 2 Drawing Sheets

APPARATUS AND METHOD FOR PREVENTING PERFORMANCE DEGRADATION OF CALL SERVICE IN A PORTABLE TERMINAL

PRIORITY

This application claims the benefit under 35 U.S.C. §119 (a) of a Korean patent application filed in the Korean Intellectual Property Office on Jul. 15, 2011 and assigned Serial No. 10-2011-0070446, the entire disclosure of which is incorporated herein by reference.

BACKGROUND OF THE INVENTION

1. Field of the Invention

The present invention relates to an apparatus and method for preventing performance degradation of a call service in a portable terminal. More particularly, the present invention relates to an apparatus and method for preventing performance degradation of a call service in a portable terminal, which is caused when the portable terminal does not perform an acquisition process with a system that it has failed to access, for a predetermined time in a weak electrical field.

2. Description of the Related Art

In general, a portable terminal acquires a system in its current region. If the acquired system is not listed as the most preferred system in a Preferred Roaming List (PRL), the portable terminal may perform system reselection every 3 minutes in order to acquire the most preferred system.

However, power is consumed during the reselection for acquisition of the most preferred system every 3 minutes. To conserve power, the selection process to acquire the most preferred system with which an access attempt has failed is discontinued for 15 minutes, when Max Access Probe Exit (MAPE) occurs during the reselection.

If the portable terminal does not receive a paging channel response from a base station despite a plurality of (1+NUM_STEP, up to 16) access probe transmissions, the portable terminal repeats the same process at a predetermined time (RS+RD) later. A sequence of access probes is referred to as an access sequence. If the portable terminal fails to receive a paging channel response from the base station despite transmitting the access sequence MAX_REQ_SEQ (up to 15) times, this is considered an access attempt failure and thus MAPE occurs.

However, when a predetermined number or more failures of call origination and termination bring about MAPE in a weak electrical field region where one system exists, the portable terminal does not perform a selection process, used to acquire the most preferred system with which the access attempt has failed, for 15 minutes in order to conserve power.

Accordingly, even though the portable terminal moves from the weak electrical field region to a strong electrical field region and thus is capable of acquiring the most preferred system, it can neither originate nor terminate a call for 15 minutes. This long unavailability of the call service degrades the performance of the call service.

SUMMARY OF THE INVENTION

Aspects of embodiments of the present invention are to address at least the above-mentioned problems and/or disadvantages and to provide at least the advantages described below. Accordingly, an aspect of exemplary embodiments of the present invention is to provide an apparatus and method for preventing performance degradation of a call service in a portable terminal, which is caused when the portable terminal does not perform an acquisition process with a system that it has failed to access, for a predetermined time in a weak electrical field.

Another aspect of exemplary embodiments of the present invention is to provide an apparatus and method for preventing performance degradation of a call service in a portable terminal by preventing long unavailability of the call service in a weak electrical field region having one system to be acquired, which is caused by non-acquisition of the system with which an access attempt has failed, for a predetermined time, when Max Access Probe Exit (MAPE) occurs.

In accordance with an exemplary embodiment of the present invention, an apparatus for preventing performance degradation of a call service in a portable terminal is provided. The apparatus includes a memory stores a Preferred Roaming List (PRL) including information about a plurality of systems and an avoidance list including information about a system to which access has failed a predetermined number or more times, and when an access attempt to originate or terminate a call to or from a specific system acquired in a weak electrical field has failed the predetermined number or more times, a controller controls reacquisition of the specific system and attempting of call origination to or call termination from the reacquired specific system.

In accordance with another exemplary embodiment of the present invention, an apparatus for preventing performance degradation of a call service in a portable terminal is provided. The apparatus includes a memory stores a PRL including information about a plurality of systems and an avoidance list including information about a system to which access has failed a predetermined number or more times, and when an access attempt has failed the predetermined number or more times in a weak electrical field, a controller controls reacquisition of a specific system acquired in the weak electrical field and attempting of call origination to or call termination from the reacquired specific system or controls discontinuation of a reselection process to acquire a most preferred system in the PRL for a predetermined time, according to a type of the failed access attempt.

In accordance with another exemplary embodiment of the present invention, a method for preventing performance degradation of a call service in a portable terminal is provided. The method includes attempting call origination to or call termination from a specific system acquired in a weak electrical field, and reacquiring the specific system and attempting call origination to or call termination from the reacquired specific system, upon occurrence of a predetermined number or more failures of the attempt to originate or terminate a call to or from the specific system.

In accordance with a further exemplary embodiment of the present invention, a method for preventing performance degradation of a call service in a portable terminal is provided. The method includes, when an access attempt has failed a predetermined number or more times in a weak electrical field, a type of the failed access attempt is determined, a specific system acquired in the weak electrical field is reacquired and call origination to or call termination from the reacquired specific system is attempted, if the type of the failed access attempt is call origination to or call termination from the specific system acquired in the weak electrical field, and a reselection process to acquire a most preferred system in a PRL is discontinued for a predetermined time, if the type of the failed access attempt is the reselection process to acquire the most preferred system in the PRL.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
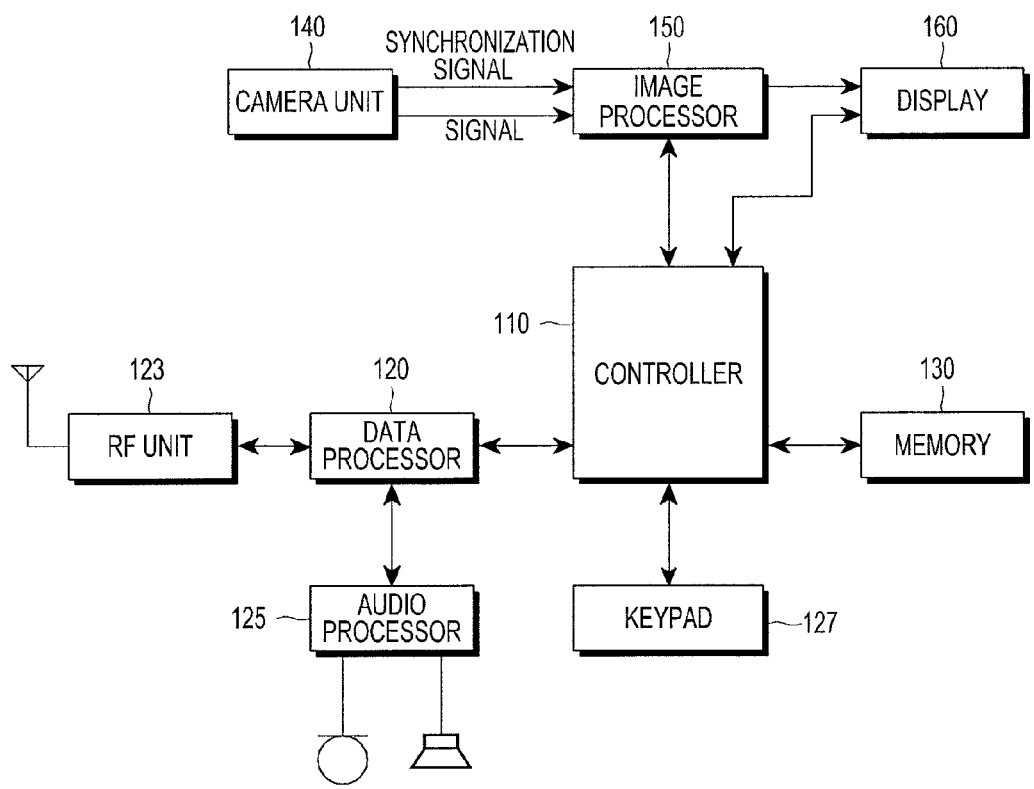
FIG. 1 is a block diagram of a portable terminal according to an exemplary embodiment of the present invention.

FIG. 1 is a block diagram of a portable terminal according to an exemplary embodiment of the present invention.

Referring to FIG. 1, a Radio Frequency (RF) unit 123 performs a wireless communication function for the portable terminal. The RF unit 123 may include an RF transmitter for upconverting the frequency of a transmission signal and amplifying the upconverted transmission signal and an RF receiver for low-noise-amplifying a received signal and downconverting the frequency of the low-noise-amplified signal. A data processor 120 may include a coder and modulator for encoding and modulating the transmission signal and a demodulator and decoder for demodulating and decoding the received signal. That is, the data processor 120 may include a MODulator-DEModulator (MODEM) and a CODer-DECoder (CODEC). The CODEC includes a data CODEC for processing packet data and an audio CODEC for processing an audio signal such as voice. An audio processor 125 reproduces a received audio signal output from the audio CODEC of the data processor 120 or transmits a transmission audio signal generated from a microphone to the audio CODEC of the data processor 120.

A keypad 127 may include alphanumerical keys for inputting digits and characters and function keys for setting various functions.

A memory 130 may include a program memory and a data memory. The program memory may store programs used to control operations of the portable terminal. Also the program memory may store programs used for controlling a specific system to be re-acquired. In addition, the program memory may store programs for controlling the portable terminal to attempt call origination or termination to the specific system, when an access attempt to the specific system acquired in a weak electrical field, for call origination or termination, has failed a predetermined number or more times according to an exemplary embodiment of the present invention. The data memory temporarily stores data generated during execution of the programs.

The memory 130 stores a Preferred Roaming List (PRL) containing information about a plurality of prioritized systems and the PRL is updated when a network is changed according to an exemplary embodiment of the present invention.

According to an exemplary embodiment of the present invention, the memory 130 also includes an avoidance list containing information about systems with which an access attempt has failed a predetermined number or more times. When an access attempt to a system has failed a predetermined number or more times during a reselection process to acquire a most preferred system in the PRL and thus Max Access Probe Exit (MAPE) occurs, information about the system is listed in the avoidance list.

The controller 110 may provide overall control to the portable terminal.

In accordance with an exemplary embodiment of the present invention, upon generation of MAPE due to a predetermined number or more failures of an access attempt to originate or terminate a call to or from a specific system acquired in a weak electrical field, the controller 110 switches the portable terminal to idle mode, re-acquires the specific system, and controls an attempt to originate or terminate a call to or from the specific system.

If the specific system acquired in the weak electrical field is not the most preferred system in the PRL, the controller 110 performs reselection to acquire the most preferred system. If an access attempt has failed a predetermined number or more times and thus MAPE occurs during the reselection, the controller 110 does not perform the reselection with the most preferred system with which an access attempt has failed, for a predetermined time. When the predetermined time has elapsed, the controller 110 resumes the reselection with the most preferred system.

When MAPE occurs in view of a predetermined number or more failed access attempts in a weak electrical field, the controller 110 attempts call origination or termination by re-acquiring a specific system acquired in the weak electrical field or discontinues a reselection process to acquire the most preferred system listed in the PRL for a predetermined time, according to the type of the access attempts.

If the type of the failed access attempts is call origination or termination to or from the specific system acquired in the weak electrical field, the controller 110 switches the portable terminal to the idle mode, reacquires the specific system, and attempts call origination or termination to or from the specific system.

If the type of the failed call attempts is a reselection process to acquire the most preferred system listed in the PRL because the specific system acquired in the weak electrical field is not the most preferred system, the controller 110 discontinues the reselection process for a predetermined time and then resumes the reselection process to acquire the most preferred system.

A camera unit 140 may include a camera sensor for capturing an image and converting the captured optical signal into an electrical signal, and a signal processor for converting the analog image signal captured through the camera sensor into digital data. Herein, the camera sensor may be a Charge Coupled Device (CCD) or Complementary Metal Oxide Semiconductor (CMOS) sensor and the signal processor may be configured as a Digital Signal Processor (DSP). The camera sensor and the signal processor may be incorporated into a single device or may be separately configured.

An image processor 150 performs Image Signal processing (ISP) to display an image signal received from the camera unit 140 on a display 160. The ISP involves functions such as gamma correction, interpolation, spatial change, image effects, image scaling, Auto White Balance (AWB), Auto Exposure (AE), Auto Focus (AF), etc. Therefore, the image processor 150 processes the image signal received from the camera unit 140 on a frame basis and outputs the frame image data according to the characteristics and size of the display 160. The image processor 150 includes a video CODEC for compressing frame image data to be displayed on the display 160 in a predetermined scheme or decompressing compressed frame image data to the original frame image data. The video CODEC may be a Joint Photographic Experts Group (JPEG) CODEC, a Moving Picture Experts Group 4 (MPEG4) CODEC, or a Wavelet CODEC. The image processor 150 may be equipped with an On Screen Display (OSD) function, and the image processor 150 may output OSD data according to the size of a displayed screen under the control of the controller 110.

The display 160 may display the image signal received from the image processor 150 on a screen and may also display user data received from the controller 110. The display 160 may be configured with a Liquid Crystal Display (LCD). In this case, the display 160 may include an LCD controller, a memory for storing image data, and an LCD device. If the LCD is configured as a touch screen, it may serve as an input unit. Thus, the display 160 may display the keys of the keypad 127.

Now a description will be given of an operation for preventing performance degradation of a call service in a weak electrical field in the portable terminal with reference to FIG. 2.

Figure 2:
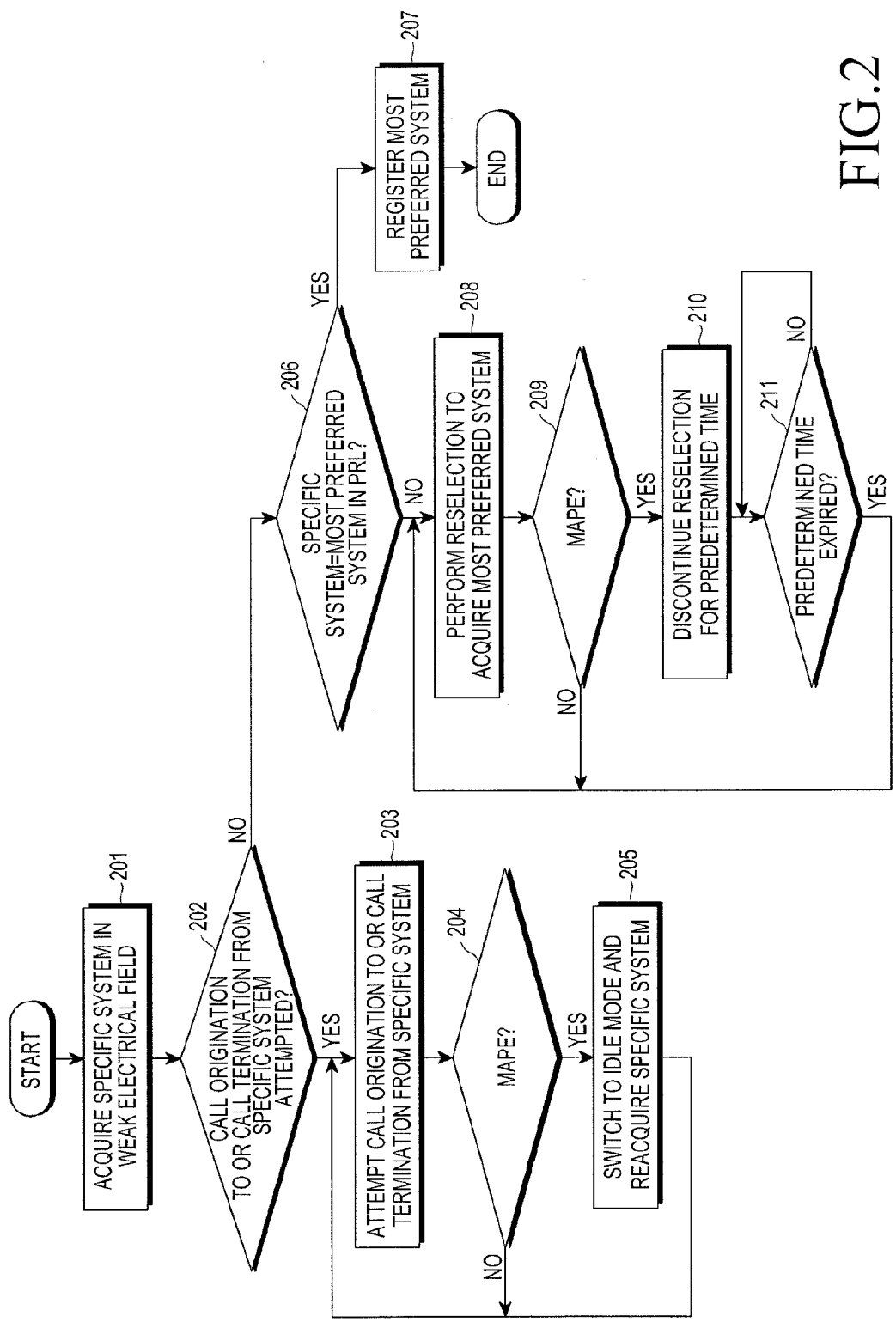
FIG. 2 is a flowchart illustrating an operation for preventing performance degradation of a call service in a weak electrical field in a portable terminal according to an exemplary embodiment of the present invention.

FIG. 2 is a flowchart illustrating an operation for preventing performance degradation of a call service in a weak electrical field in a portable terminal according to an exemplary embodiment of the present invention.

An exemplary embodiment of the present invention will be described with reference to FIGS. 1 and 2.

Referring to FIG. 2, a specific system is acquired in a weak electrical field region where one system exists in step 201. When determining to originate or terminate a call to or from the acquired specific system in step 202, the controller 110 attempts the call origination or termination to or from the specific system in step 203.

Upon the occurrence of MAPE in view of a predetermined number or more failed access attempts for the call origination or termination to or from the specific system in step 204, the controller 110 switches the portable terminal to idle mode and reacquires the specific system in the idle mode in step 205.

Then the controller 110 returns to step 203 in order to reattempt call origination or termination to or from the reacquired specific system. However, if MAPE does not occur in step 204, the controller returns to step 203.

When determining to not originate or terminate a call to or from the acquired specific system in step 202, the controller proceeds to step 206. If the specific system is the most preferred system listed in the PRL in step 206, the controller 110 registers the specific system as the most preferred system in step 207.

On the contrary, if the specific system is not the most preferred system listed in the PRL in step 206, the controller 110 performs a reselection process to acquire the most preferred system in step 208.

If an access attempt has failed a predetermined number or more times during the reselection process and thus MAPE occurs in step 209, the controller 110 stores information about the most preferred system in the avoidance list of the memory 130 and discontinues the reselection process with the most preferred system for a predetermined time, for example, 15 minutes in step 210.

During the predetermined time, the controller 110 performs a reselection process to acquire a second-to-the best system listed in a scan list generated with information about the systems listed in the PRL. The scan list may not include information about the most preferred system.

When the predetermined time elapses in step 211, the controller 110 returns to step 208 to perform the reselection process for acquisition of the most preferred system. However, if MAPE does not occur in step 209, the controller returns to step 203.

As described with reference to FIG. 2, in the case where an access attempt failure occurs a predetermined number or more times, thus causing MAPE in a weak electrical field where one system exists, if the access attempts are for call origination or termination to or from a specific system acquired in the weak electrical field, the call origination or termination may be continuously attempted to the specific system.

Therefore, as the portable terminal moves from the weak electrical field region having one system to a strong electrical field region having a plurality of systems including the most preferred system, the portable terminal can acquire the most preferred system listed in the PRL and directly originate or terminate a call to or from the most preferred system.

As is apparent from the above description, since exemplary embodiments of the present invention provide an apparatus and method for preventing performance degradation of a call service in a portable terminal, it can prevent performance degradation of the call service caused by discontinuation of an acquisition process, for a predetermined time, with a system with which an access attempt has failed in a weak electrical field.

In addition, exemplary embodiments of the present invention can prevent long unavailability of a call service in the weak electrical field where one system can be acquired, which is caused by, upon occurrence of MAPE, discontinuing an acquisition process, for a predetermined time, with a system with which an access attempt has failed, in order to conserve power.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
a memory for storing a Preferred Roaming List (PRL) including information about at least one system; and
a controller for acquiring a specific system from the PRL, attempting a call connection through the acquired specific system, determining whether a predetermined number of call connection failures through the acquired specific system has occurred, and repeating the acquiring, the attempting, and the determining until the call connection is successful if the predetermined number of call connection failures has occurred,
wherein, if the acquired specific system is not a most preferred system in the PRL, the controller performs a reselection process to acquire the most preferred system and, upon occurrence of Max Access Probe Exit (MAPE) due to the predetermined number or more failures of an access attempt during the reselection process, discontinues the reselection process with the most preferred system for a predetermined time.

2. The portable terminal of claim 1, wherein, if Max Access Probe Exit (MAPE) occurs due to the predetermined number or more failures of the call connection through the acquired specific system that is acquired in a weak electrical field, the controller switches the portable terminal to an idle mode and controls reacquisition of the specific system and attempting of the call connection through the reacquired specific system in the idle mode.

3. The portable terminal of claim 1, wherein the controller resumes the reselection process with the most preferred system after the predetermined time.

4. The portable terminal of claim 1, wherein the controller controls to acquire a second best system during the predetermined time.

5. The portable terminal of claim 1, wherein:
if a predetermined number of access attempt failures has occurred in a weak electrical field, the controller discontinues a reselection process to acquire the specific system in the PRL for a predetermined time.

6. The portable terminal of claim 5, wherein, the controller resumes the reselection process with the most preferred system, when the predetermined time elapses.

7. The portable terminal of claim 5, wherein the controller controls to acquire a second best system during the predetermined time.

8. A method for preventing performance degradation of a call service in a portable terminal, the method comprising:
acquiring a specific system;
attempting a call connection through the acquired specific system;
determining whether a predetermined number of the call connection failures through the acquired specific system has occurred;
determining if the specific system is a most preferred system in a Preferred Roaming List (PRL);
performing a reselection process to acquire the most preferred system, if the specific system is not the most preferred system in the PRL;
discontinuing the reselection process with the most preferred system for a predetermined time, upon occurrence of Max Access Probe Exit (MAPE) due to a predetermined number or more failures of the call connection during the reselection process;
resuming the reselection process with the most preferred system after the predetermined time elapses; and
repeating the acquiring, the attempting, and the determining until the call connection is successful if the predetermined number of call connection failures has occurred.

9. The method of claim 8, wherein the attempting of the call connection comprises:
switching the portable terminal to an idle mode and controlling reacquisition of the specific system, if Max Access Probe Exit (MAPE) occurs due to the predetermined number or more failures of the call connection through the specific system that is acquired in a weak electrical field; and
attempting the call connection from the reacquired specific system in the idle mode.

10. The method of claim 8, further comprising acquiring a second best system during the predetermined time.

11. The method of claim 8, further comprising:
determining, if a predetermined number of access attempt failures has occurred, a type of the failed access attempt; and
discontinuing a reselection process to acquire the specific system in a Preferred Roaming List (PRL) for a predetermined time, if a type of the failed access attempt is the reselection process to acquire a most preferred system in the PRL.

12. The method of claim 11, wherein the reselection process is performed to acquire a most preferred system, if the specific system acquired in the weak electrical field is not the most preferred system in the PRL.

13. The method of claim 12, wherein the discontinuing of the reselection process further comprises resuming the reselection process to acquire the most preferred system, when the predetermined time elapses.

14. The method of claim 11, further comprising acquiring a second system during the predetermined time.

* * * * *